United States Patent
Mahoney

(10) Patent No.: US 8,931,329 B2
(45) Date of Patent: *Jan. 13, 2015

(54) SYSTEM AND METHOD FOR DETECTING A LEAK IN AN AIR BED

(71) Applicant: Select Comfort Corporation, Minneapolis, MN (US)

(72) Inventor: Paul James Mahoney, Stillwater, MN (US)

(73) Assignee: Select Comfort Corporation, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/724,818

(22) Filed: Dec. 21, 2012

(65) Prior Publication Data

US 2014/0007656 A1    Jan. 9, 2014

Related U.S. Application Data

(63) Continuation of application No. 12/600,398, filed as application No. PCT/US2007/012369 on May 24, 2007, now Pat. No. 8,336,369.

(51) Int. Cl.
G01M 3/32    (2006.01)

(52) U.S. Cl.
CPC .......... *G01M 3/3218* (2013.01); *G01M 3/3263* (2013.01)
USPC ................................................ 73/40; 73/49.3

(58) Field of Classification Search
USPC .................................... 73/40, 49.3
See application file for complete search history.

(56) References Cited

U.S. PATENT DOCUMENTS

| 2,995,922 A | 8/1961 | Firth et al. |
| 3,413,840 A | 12/1968 | Basile et al. |
| 4,441,357 A | 4/1984 | Kahn et al. |
| 6,108,843 A | 8/2000 | Suzuki et al. |
| 6,182,501 B1 | 2/2001 | Furuse et al. |
| 2007/0094806 A1* | 5/2007 | Beretta ............................. 5/713 |

(Continued)

FOREIGN PATENT DOCUMENTS

| AU | 2007353871 B2 | 4/2014 |
| JP | 2229976 | 9/1990 |

OTHER PUBLICATIONS

"Australian Application Serial No. 2007353871, Examination Report mailed Oct. 23, 2012", 3 pgs.

(Continued)

*Primary Examiner* — Paul West
(74) *Attorney, Agent, or Firm* — Fish & Richardson P.C.

(57) ABSTRACT

A leak detection method for an air bed having an air chamber comprises adjusting the air chamber to a predetermined pressure level, sensing a first pressure value of the air chamber after a first time interval, sensing a second pressure value of the air chamber after a second time interval, determining a pressure change in the air chamber, detecting whether the air chamber is leaking by comparing the pressure change with a second pressure value, and displaying a leak detection indicator. In one embodiment, the second pressure value is a pressure change in a second air chamber. In another embodiment, the second pressure value is an expected pressure change of the air chamber that is calculated based upon changes in ambient temperature and barometric pressure.

21 Claims, 6 Drawing Sheets

(56) References Cited

U.S. PATENT DOCUMENTS

2007/0186623 A1   8/2007   Wolford et al.
2010/0206051 A1   8/2010   Mahoney

OTHER PUBLICATIONS

"Canadian Application Serial No. 2,688,027, Office Action mailed Aug. 6, 2013", 4 pgs.
"International Application Serial No. PCT/US07/12369, Written Opinion mailed Jan. 4, 2008", 5 pgs.
"U.S. Appl. No. 12/600,398 International Search Report mailed Jan. 4, 2008". 1.
"U.S. Appl. No. 12/600,398, Non Final Office Action mailed Apr. 30, 2012", 11 pgs.
"U.S. Appl. No. 12/600,398, Notice of Allowance mailed Aug. 23, 2012", 7 pgs.
"U.S. Appl. No. 12/600,398, Response filed Jul. 30, 2012 to Non-Final mailed Apr. 30, 2012", 6 pgs.
"International Application Serial No. PCT/US2007/012369, International Preliminary Report on Patentability mailed Dec. 3, 2009", 7 pgs.
"Australian Application Serial No. 2007353871, Response filed Nov. 6, 2013 to First Examination Report mailed Oct. 23, 2012", 14 pgs.
"Canadian Application Serial No. 2,688,027, Office Action mailed Feb. 24, 2014", 2 pgs.

* cited by examiner

SYSTEM AND METHOD FOR DETECTING A LEAK IN AN AIR BED

CLAIM OF PRIORITY

This application is a continuation of and claims the benefit of priority under 35 U.S.C. §120 to U.S. patent application Ser. No. 12/600,398, filed on Nov. 16, 2009, which is a 371 of International Application No. PCT/US2007/012369, filed on May 24, 2007, which are hereby incorporated by reference herein in their entirety.

BACKGROUND OF THE INVENTION

The present invention relates to a system and method for detecting an air leak. More particularly, the present invention relates to a system and method for detecting an air leak in an air bed having one or more separate air chambers.

Advances made in the quality of air beds having air chambers as support bases have resulted in vastly increased popularity and sales of such air beds. These air beds are advantageous in that they have an electronic control panel which allows a user to select a desired inflation setting for optimal comfort and to change the inflation setting at any time, thereby providing changes in the firmness of the bed.

One feature inherent in all air beds is a slight variation in air chamber pressure over time. Specifically, it is well known that the pressure in an air chamber will vary over time with changes in the ambient temperature and barometric pressure. Thus, a user may set their air bed at a maximum firmness on one day, only to find that the bed feels slightly softer a few days later.

Because air beds are still a relatively new form of sleeping surface as compared with traditional innerspring mattresses, the majority of the population is not familiar with their operation. As a result, it is not uncommon for a recent purchaser of an air bed to set their bed at a desired firmness level only to find out that their bed must be "re-adjusted" to the desired firmness level at a later time. As a result, many users that experience this type of phenomenon believe their bed must have an air leak and call the customer service department at the bed manufacturer to express their concerns.

Under these circumstances, the customer service department will typically respond by telling the customer to fill up the chambers in the air bed to their maximum pressure, disconnect the pump, place a cap member on the chambers, and call back in a day or two if the chamber pressures have decreased. However, this type of process does not take into account pressure losses resulting from changes in ambient temperature or barometric pressure. Thus, for a small decrease in chamber pressure, it may be difficult to determine if the pressure decrease is the result of a slow leak or merely the chamber's response to changes in its surroundings.

Therefore, there is a need for a leak detection method for an air bed that is able to disregard any reduction in chamber pressure due to changes in ambient temperature and barometric pressure in order to more accurately determine whether an air chamber contains a leak.

BRIEF SUMMARY OF THE INVENTION

The present invention solves the foregoing problems by providing a leak detection method for an air bed having an air chamber comprising adjusting the air chamber to a predetermined pressure level, sensing a first pressure value of the air chamber after a first time interval, sensing a second pressure value of the air chamber after a second time interval, determining a pressure change in the air chamber, detecting whether the air chamber is leaking by comparing the pressure change with a second pressure value, and displaying a leak detection indicator. In one embodiment, the second pressure value is a pressure change in a second air chamber. In another embodiment, the second pressure value is an expected pressure change of the air chamber that is calculated based upon changes in ambient temperature and barometric pressure.

The present invention also provides a system for detecting air leaks in an air bed having one or more separate air chambers comprising a pressure sensing means adapted to monitor pressure within the one or more air chambers, a control device operably connected to the pressure sensing means, and a display means operably connected to the control device. The control device includes control logic that is capable of monitoring, receiving, and storing chamber pressure readings from the pressure sensing means and translating the chamber pressure readings into an output signal containing a leak detection indicator. The display means is capable of receiving the output signal from the control device and visually displaying the leak detection indicator, the leak detection indicator signifying whether or not a leak is present in any of the one or more air chambers.

DETAILED DESCRIPTION OF THE INVENTION

Figure 1:
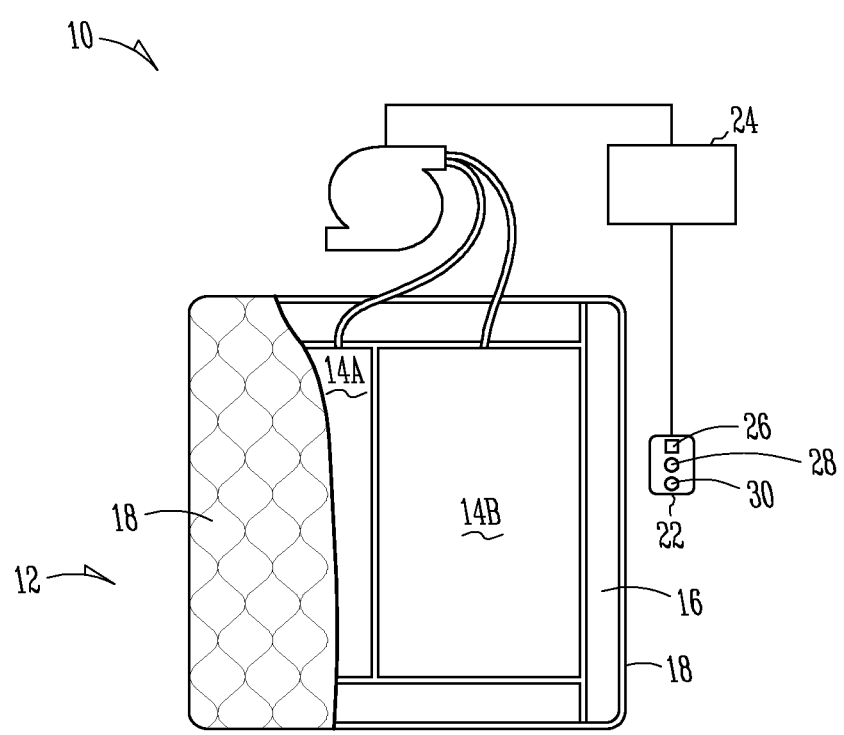
FIG. 1 is a diagrammatic representation of one embodiment of an air bed system.

Referring now to the figures, and first to FIG. 1, there is shown a diagrammatic representation of air bed system 10 of the present invention. The system 10 includes bed 12, which generally comprises at least one air chamber 14 surrounded by a resilient, preferably foam, border 16 and encapsulated by bed ticking 18.

As illustrated in FIG. 1, bed 12 is a two chamber design having a left air chamber 14A and a right air chamber 14B. Chambers 14A and 14B are in fluid communication with pump 20. Pump 20 is in electrical communication with a manual, hand-held remote control 22 via control box 24. Control box 24 operates pump 20 to cause increases and decreases in the fluid pressure of chambers 14A and 14B based upon commands input by a user through remote control 22. Remote control 22 includes display 26, output selecting means 28, and leak detection start button 30. Output selecting means 28 allows the user to switch the pump output between left and right chambers 14A and 14B, thus enabling control of multiple chambers with a single remote control unit. As will be discussed in more detail to follow, leak detection start button 30 is designed such that when actuated by the user, control box 24 initiates a leak detection sequence that detects whether one or more of the air chambers have an air leak.

Figure 2:
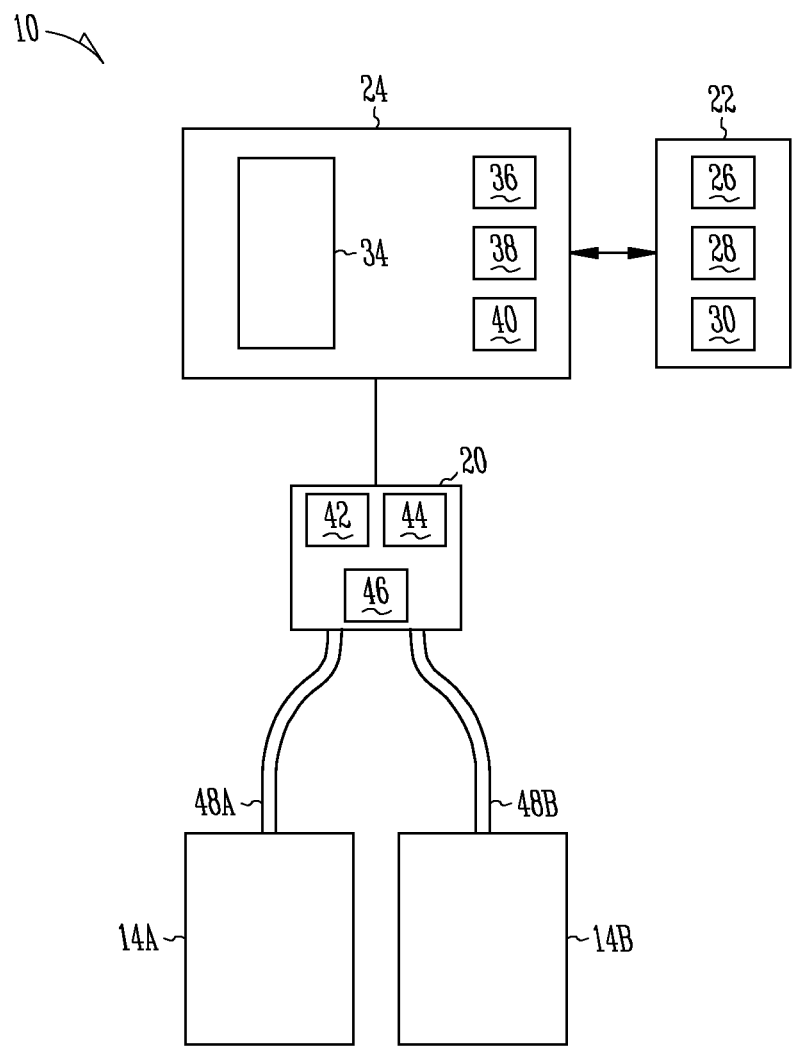
FIG. 2 is a block diagram of the various components of the air bed system illustrated in FIG. 1.

FIG. 2 shows a block diagram detailing the data communication between the various components of system 10.

Beginning with control box 24, it can be seen that control box 24 comprises power supply 34, at least one microprocessor 36, at least one switching means 38, and at least one analog to digital (A/D) converter 40. Switching means 38 may be, for example, a relay or a solid state switch.

Pump 20 is preferably in two-way communication with control box 24. Pump 20 includes motor 42, relief valve 44, and pressure transducer 46, and is fluidly connected with left chamber 14A and right chamber 14B via first tube 48A and second tube 48B, respectively. Also in two-way communication with control box 24 is hand-held remote control 22.

In operation, power supply 34 receives power, preferably 110 VAC power, from an external source and converts it to the various forms required by the different components. Microprocessor 36 is used to control various logic sequences of the present invention. Two examples of such sequences are detailed in FIGS. 3 and 5, which will be discussed in more detail below.

The embodiment of system 10 shown in FIG. 2 contemplates two chambers 14A and 14B and a single pump 20. Alternatively, in the case of a bed with two chambers, it is envisioned that a second pump may be incorporated into the system such that a separate pump is associated with each chamber. Separate pumps would allow each chamber to be inflated or deflated independently and simultaneously. Additionally, a second pressure transducer may also be incorporated into the system such that a separate pressure transducer is associated with each chamber.

In the event that microprocessor 36 sends a decrease pressure command to one of the chambers, switching means 38 is used to convert the low voltage command signals sent by microprocessor 36 to higher operating voltages sufficient to operate relief valve 44 of pump 20. Alternatively, switching means 38 could be located within pump 20. Opening relief valve 44 allows air to escape from first and second chambers 14A and 14B through air tubes 48A and 48B. During deflation, pressure transducer 46 sends pressure readings to microprocessor 36 via A/D converter 40. A/D converter 40 receives analog information from pressure transducer 46 and converts that information to digital information useable by microprocessor 36.

In the event that microprocessor 36 sends an increase pressure command, pump motor 42 is energized, sending air to the designated chamber through air tube 48A or 48B. Again, pressure transducer 46 sends pressure readings to microprocessor 36 via A/D converter 40.

Microprocessor 36 uses the information received from A/D converter 40 to determine the difference between the actual pressure in the chamber 14 and the desired pressure. Microprocessor 36 sends the digital signal to remote control 22 to update display 26 on the remote control in order to convey the pressure information to the user.

Figure 3:
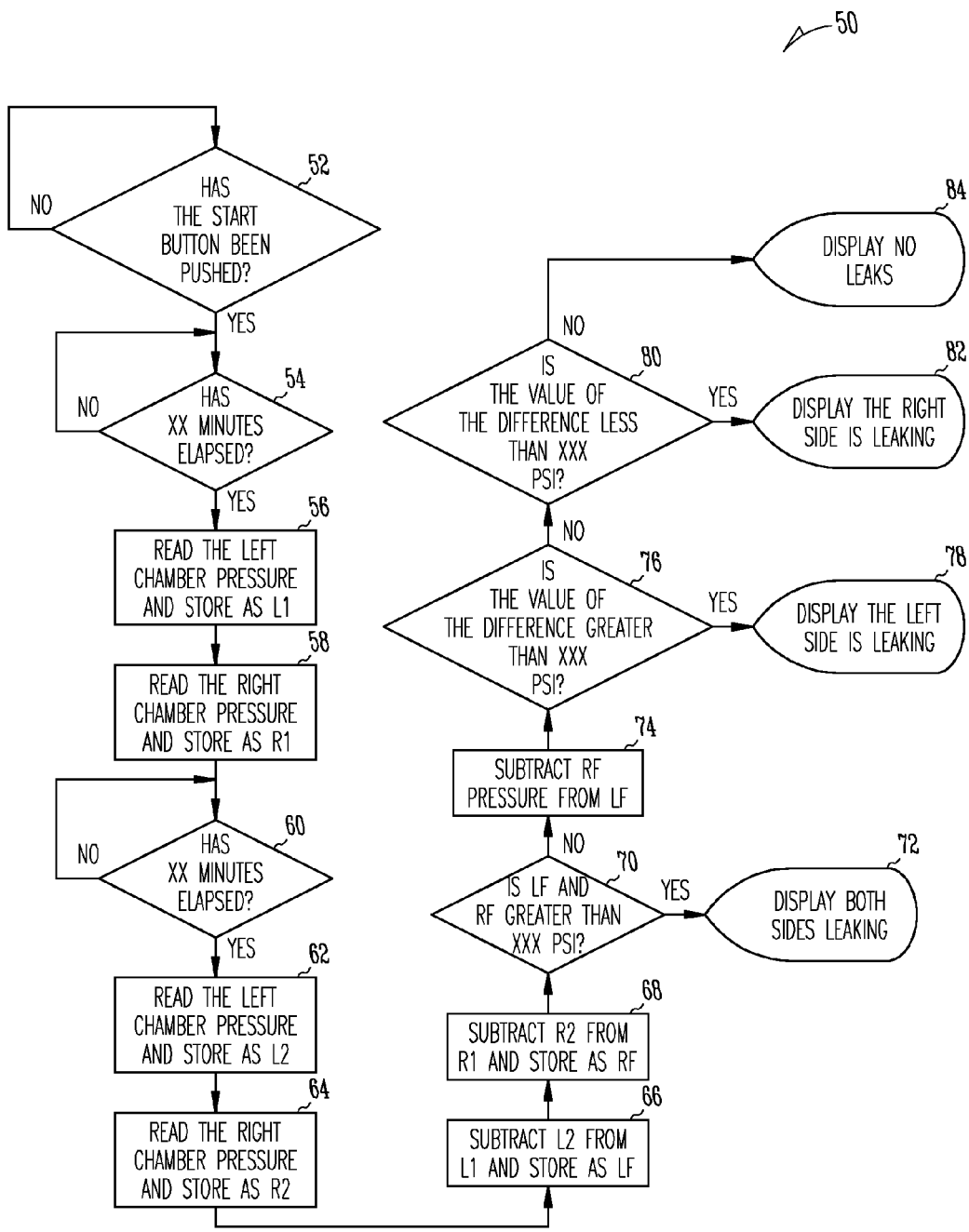
FIG. 3 is a flowchart of a first embodiment of a leak detection method according to the present invention.

Now that a brief description of an air bed system has been provided, a few embodiments of a leak detection method according to the present invention will be described in detail. In particular, FIG. 3 illustrates a flowchart of a sample control logic sequence of a first leak detection method 50 according to the present invention. The sequence begins at step 52 when a start button is actuated to increase the pressure in first and second chambers 14A and 14B to a predetermined pressure value. For instance, the predetermined pressure value may be the maximum pressure (or firmness) that first and second chambers 14A and 14B are programmed to withstand. However, the predetermined pressure value may be any other pressure without departing from the intended scope of the present invention. The start button may be provided on manual remote control 22, as illustrated by button 30 in FIG. 2. Alternatively, the start button may be provided on another component of system 10, such as pump 20.

The method continues in step 54 where microprocessor 36 monitors the time that has elapsed since the start button was actuated in step 52 to fill first and second chambers 14A and 14B to the predetermined pressure value. After a first predetermined time interval has elapsed, a first pressure within left chamber 14A is detected by pressure transducer 46 in step 56 and communicated to control box 24 as L1. Then, a first pressure within right chamber 14B is detected by pressure transducer 46 in step 58 and communicated to control box 24 as R1. In one embodiment, the first predetermined time interval is about one minute, although numerous other time intervals are contemplated. In another embodiment, step 54 may be omitted and the chamber pressures in steps 56 and 58 may be detected immediately after the start button is actuated in step 52. However, waiting for a set period of time prior to detecting chamber pressures may be preferable because the chamber pressures are given a period in which to stabilize, thus providing more accurate readings.

Next, in step 60, microprocessor 36 monitors the time that has elapsed since the left and right chamber pressures were detected in steps 56 and 58. After a second predetermined time interval has elapsed, a second pressure within left chamber 14A is detected by pressure transducer 46 in step 62 and communicated to control box 24 as L2. A second pressure within right chamber 14B is then detected by pressure transducer 46 in step 64 and communicated to control box 24 as R2. In one embodiment, the second predetermined time interval is about 20 minutes, although numerous other time intervals are contemplated.

The sequence continues at step 66, where microprocessor 36 determines the difference between pressure values L1 and L2 by subtracting the second chamber pressure reading L2 detected in step 62 from the first chamber pressure reading L1 detected in step 56, which is then stored as Lf. Then, in step 68, microprocessor 36 determines the difference between pressure values R1 and R2 by subtracting the second chamber pressure reading R2 detected in step 64 from the first chamber pressure reading R1 detected in step 58, which is then stored as Rf. One skilled in the art will appreciate that the order of subtraction in steps 66 and 68 may be reversed without departing from the intended scope of the present invention.

Next, pressure changes Lf and Rf are compared with a maximum acceptable pressure change in step 70. If both pressure changes Lf and Rf are greater than the maximum acceptable pressure change, display 26 of remote control 22 displays an indicator signifying that both left and right chambers 14A and 14B are leaking in step 72. Display 26 may be configured to display numerous types of indicators such as, for example, text messages. However, if one or both of pressure change values Lf and Rf are not greater than the maximum acceptable pressure change, the sequence continues at step 74 where pressure change Rf in right chamber 14B is subtracted from pressure change Lf in left chamber 14A.

The value of the pressure difference calculated in step 74 is then compared with a predetermined pressure value in step 76, which may be any value greater than or equal to zero. If the value of the pressure difference is greater than the predetermined pressure value, then display 26 of remote control 22 displays an indicator signifying that left chamber 14A is leaking in step 78. If the value of the pressure difference is not greater than the predetermined pressure value, the sequence continues at step 80 by determining whether the value of the pressure difference is less than the inverse of the predetermined pressure value. If the value of the pressure difference is less than the inverse of the predetermined pressure value, then display 26 of remote control 22 displays an indicator signifying that right chamber 14B is leaking in step 82. If the value of the pressure difference is not less than the inverse of the predetermined pressure value, then display 26 of remote control 22 displays an indicator signifying that neither left chamber 14A nor right chamber 14B are leaking in step 84.

It is important to note that first leak detection method 50 may be initiated by means other than providing a start button that may be actuated in order to check for chamber leaks. For example, in other embodiments, remote control 22 may include a fill button, a pressure increase button, and a pressure decrease button. In order to check for an air chamber leak, left and right chambers 14A and 14B may be filled to a maximum pressure value by actuating the fill button. This step creates an equal pressure in both left and right chambers 14A and 14B. The leak detection method may continue by actuating the pressure increase button. Since both left and right chambers 14A and 14B have already been filled to their maximum pressure values, actuating the pressure increase button at this point in time serves as an indication to control box 24 that the user would like to check for air leaks in the air chambers. After the pressure increase button has been actuated, the method continues at step 54 as discussed above by monitoring an elapsed time prior to detecting the chamber pressure within left and right chambers 14A and 14B.

Figure 4:
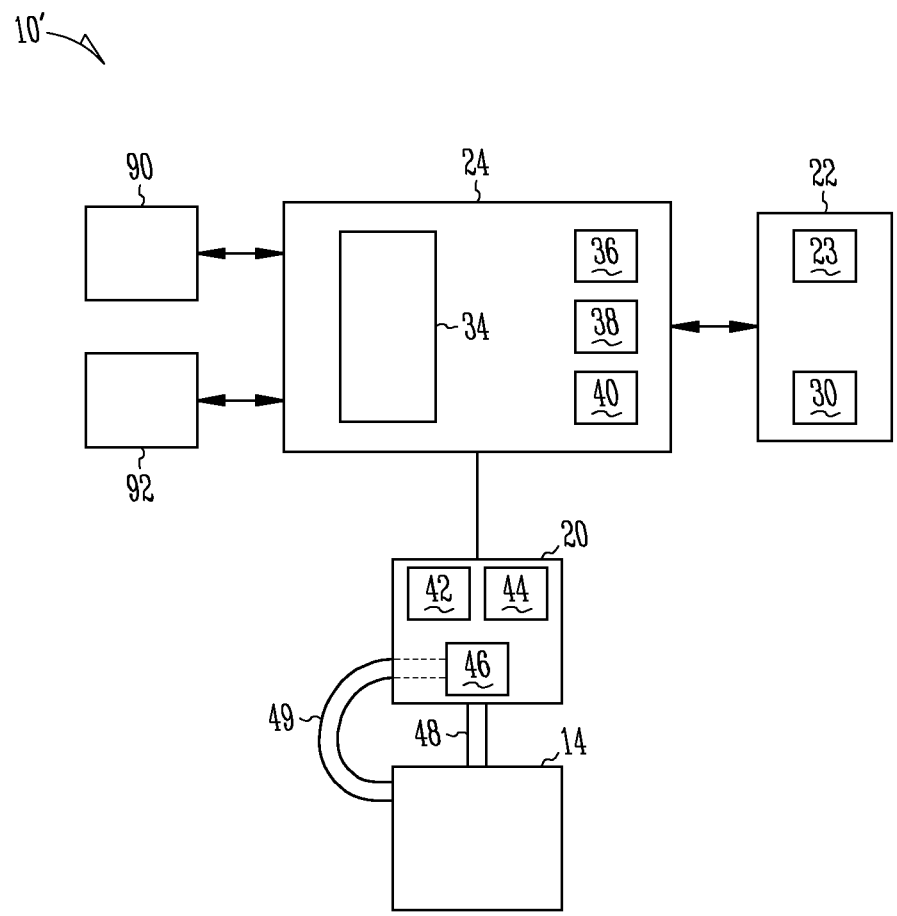
FIG. 4 is a block diagram of the various components of an alternative embodiment of an air bed system.

FIG. 4 shows a block diagram of air bed system 10', which is an alternative embodiment of system 10 shown and described above in reference to FIGS. 1 and 2. In particular, the components of system 10' are generally similar to those that form system 10, as indicated by the continued use of the same reference numerals. However, system 10' differs from system 10 in that system 10' includes only a single air chamber 14; a pressure tube 49 coupled directly between chamber 14 and pressure transducer 46; and an ambient temperature sensor 90 and barometric pressure sensor 92 in communication with control box 24. Having a separate, dedicated pressure tube 49 for allowing pressure transducer 46 to directly sense pressure within chamber 14 may provide more accurate chamber pressure readings. One skilled in the art will appreciate that similar pressure tubes may be incorporated into air bed system 10 described above in order to directly couple pressure transducer 46 to left air chamber 14A and right air chamber 14B.

As will be discussed in further detail in subsequent paragraphs, temperature sensor 90 is configured to detect the ambient temperature surrounding system 10' and communicate the temperature to control box 24. Similarly, pressure sensor 92 is configured to detect the barometric pressure and communicate the pressure to control box 24. The ambient temperature and barometric pressure readings may be used in a leak detection sequence in order to determine if air chamber 14 has an air leak in such a way as to eliminate the possibility that a decrease in chamber pressure is the result of a change in ambient temperature or barometric pressure.

In reference to first leak detection method 50, it is not necessary to obtain ambient temperature or barometric pressure readings in a system having two or more air chambers because changes in ambient temperature or barometric pressure will affect all air chambers in a similar manner. Thus, it is possible to determine if there is an air leak in one or more of the chambers by comparing only the chamber pressure readings over a period of time, while eliminating as a factor any reduction in chamber pressure as a result of a change in ambient temperature or barometric pressure. However, one skilled in the art will appreciate that system 10 may nevertheless incorporate an ambient temperature sensor and a barometric pressure sensor that communicate temperature and pressure readings for use by first leak detection method 50 without departing from the intended scope of the present invention. For example, temperature and pressure readings may be utilized in method 50 to determine the maximum acceptable pressure change in step 70.

Figure 5:
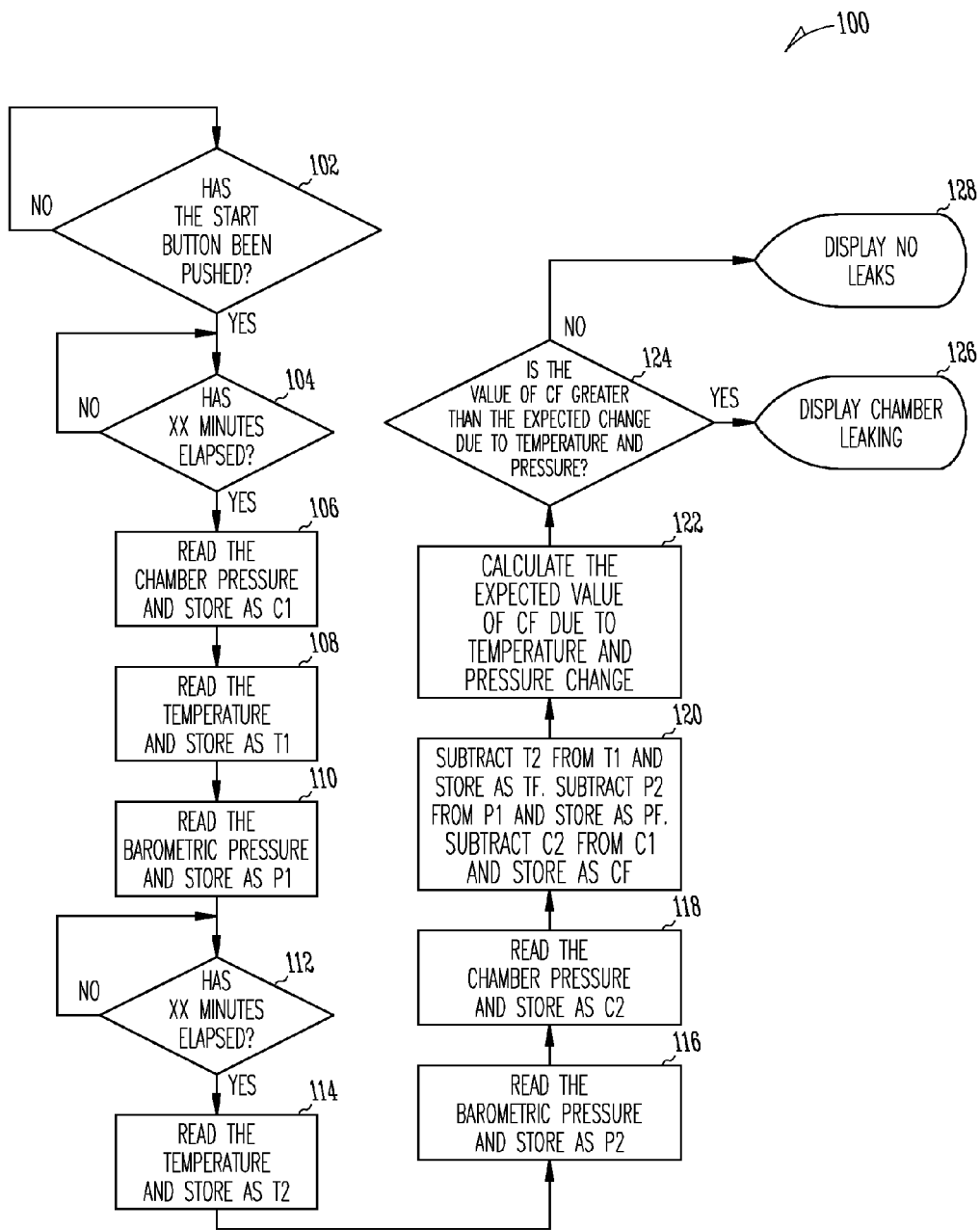
FIG. 5 is a flowchart of a second embodiment of a leak detection method according to the present invention.

FIG. 5 illustrates a flowchart of a sample control logic sequence of a second leak detection method 100 according to the present invention. The sequence begins at step 102 when start button 30 on remote control 22 is actuated in order to increase the pressure in chamber 14 to a predetermined pressure value. Once again, the predetermined pressure value may be the maximum pressure (or firmness) that chamber 14 is programmed to withstand, or some other pressure value that is less than the maximum value.

The method continues in step 104 where microprocessor 36 monitors the time that has elapsed since the start button was actuated in step 102 to fill chamber 14 to the predetermined pressure value. After a first predetermined time interval has elapsed, a first pressure within chamber 14 is detected by pressure transducer 46 in step 106 and communicated to control box 24 as C1.

Next, the ambient air temperature is detected in step 108 and communicated to control box 24 as T1. The ambient air temperature may be sensed using, for example, temperature sensor 90 shown in FIG. 4. Similarly, the barometric pressure is detected in step 110 and communicated to control box 24 as P1. The barometric pressure may be sensed using, for example, barometric pressure sensor 92 shown in FIG. 4.

In step 112, microprocessor 36 monitors the time that has elapsed since the chamber pressure, ambient temperature, and barometric pressure were detected. After a second predetermined time interval has elapsed, ambient temperature is once again detected in step 114 and communicated to control box 24 as T2. Barometric pressure is then detected again in step 116 and communicated to control box 24 as P2. Finally, chamber pressure is once again detected in step 118 and communicated to control box 24 as C2.

The sequence continues at step 120, where the following calculations are made by microprocessor 36: (1) the second ambient temperature reading T2 detected in step 114 is subtracted from the first ambient temperature reading T1 detected in step 108 and stored as Tf; (2) the second barometric pressure reading P2 detected in step 116 is subtracted from the first barometric pressure reading P1 detected in step 110 and stored as Pf; and (3) the second chamber pressure reading C2 detected in step 118 is subtracted from the first chamber pressure reading C1 detected in step 106 and stored as Cf. One skilled in the art will appreciate that the order of subtraction in step 120 may be reversed without departing from the intended scope of the present invention.

Next, in step 122, microprocessor 36 determines an expected change in chamber pressure as a result of any changes in ambient temperature and barometric pressure. The expected change in chamber pressure is then compared with the actual change in chamber pressure Cf in step 124. If the value of Cf is greater than the expected change in chamber pressure due to changes in ambient temperature and barometric pressure, display 26 of remote control 22 displays an indicator signifying that chamber 14 is leaking in step 126. However, if the value of Cf is less than or equal to the expected change in chamber pressure due to changes in ambient temperature and barometric pressure, display 26 displays an indicator signifying that chamber 14 is not leaking in step 128. The expected change in chamber pressure may alternatively be stated as an acceptable range wherein, for example, the system determines whether the actual change in chamber pressure Cf falls outside of the acceptable range.

It will be obvious to one skilled in the art that the order and number of steps in first and second leak detection methods 50 and 100 may be modified without departing from the intended scope of the present invention.

Figure 6:
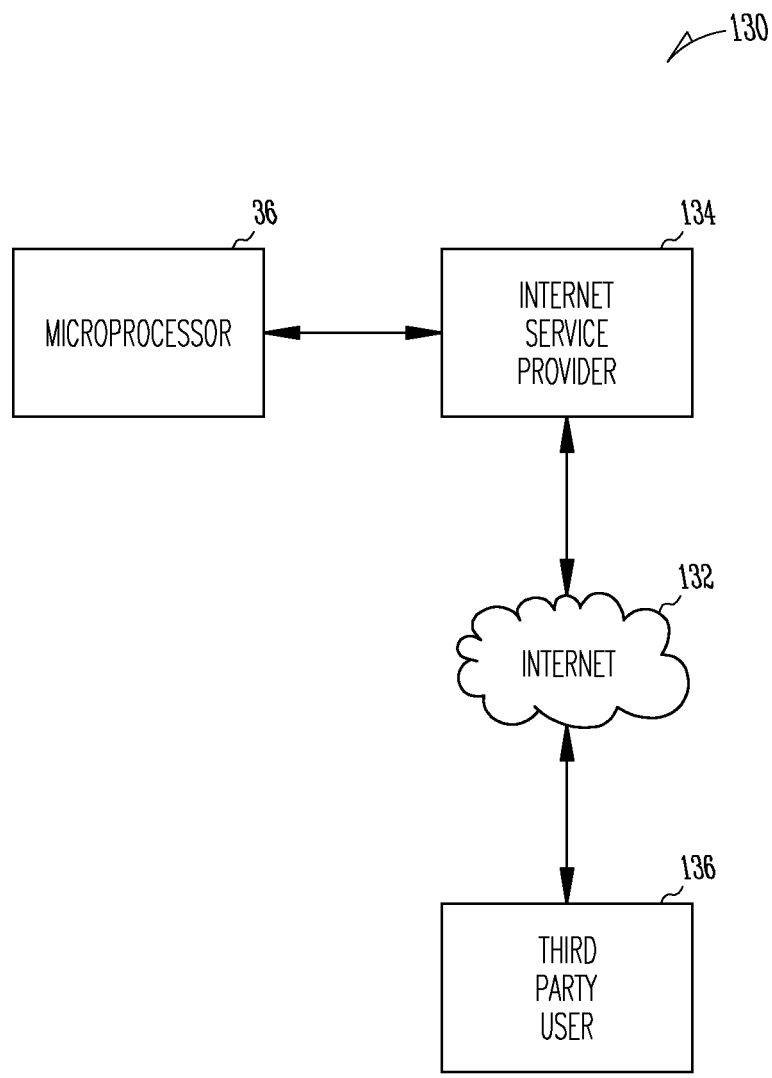
FIG. 6 is block diagram illustrating an air bed system according to the present invention incorporated into a network system for remote access.

Referring now to FIG. 6, in yet another alternate embodiment in accordance with the present invention, microprocessor 36 may be integrated within network 130 for remote accessing and use of a leak detection method according to the present invention for identifying an air leak in one or more air chambers. This allows for centralized data storage and archival of air bed system information by, for example, the customer service department of the air bed system manufacturer. Additionally, networking may provide for information input and retrieval, as well as remote access of control box 24 to operate the air bed system.

Network 130 may be integrated either locally or accessible via a public network protocol such as the Internet 132 and optionally through an Internet service provider 134. Connection to network 130 may be wired or wireless, and may incorporate control from a detached device (e.g., handheld, laptop, tablet, or other mobile device). In addition, microprocessor 36 may be accessible remotely by a third party user 136 via Internet 132 and/or Internet service provider 134.

Network 130 may be configured to enable remote leak detection of an air bed system by a third party user 136, such as by a customer service representative at a remote location. In particular, the customer service representative may be able to remotely connect to Internet 132 and perform a leak detection test, such as first and second leak detection methods 50 and 100 previously described, in order to detect if one or more of the air chambers contain a leak. Network 130 may also be configured to allow the customer service representative to remotely monitor numerous operating parameters, such as pressure within the air chambers, as well as to receive the output of the leak detection test indicating whether any air chamber leaks were detected. As a result, the customer service representative may be able to take over complete control of the leak testing and eliminate the need for the user to actively participate in the testing process. Numerous other advantages of network 130 will be appreciated by one having ordinary skill in the art.

Although the present invention has been described with reference to preferred embodiments, workers skilled in the art will recognize that changes may be made in form and detail without departing from the spirit and scope of the invention.

I claim:

1. A leak detection method for an air bed having a first chamber and a second chamber, the method comprising:
    adjusting the first and second chambers to an initial pressure level;
    sensing a first pressure value of the first chamber and a first pressure value of the second chamber after a first time interval;
    sensing a second pressure value of the first chamber and a second pressure value of the second chamber after a second time interval;
    determining a pressure change of the first chamber;
    determining a pressure change of the second chamber;
    comparing the pressure change of the first chamber and the pressure change of the second chamber with a maximum acceptable pressure change value;
    comparing the pressure change of the first chamber with the pressure change of the second chamber to determine if there is a leak in the first chamber or the second chamber; and
    displaying a leak detection indicator based upon the pressure changes of the first and second chambers.

2. The leak detection method of claim 1, wherein the step of determining the pressure change of the first chamber comprises subtracting the second pressure value of the first chamber from the first pressure value of the first chamber.

3. The leak detection method of claim 2, wherein the step of determining the pressure change of the second chamber comprises subtracting the second pressure value of the second chamber from the first pressure value of the second chamber.

4. The leak detection method of claim 1, wherein the leak detection indicator is a text message.

5. The leak detection method of claim 1, wherein the maximum acceptable pressure change value is a predetermined constant value.

6. The leak detection method of claim 1, wherein the maximum acceptable pressure change value is a calculated value based upon changes in ambient temperature and barometric pressure.

7. The leak detection method of claim 1, wherein a leak detection indicator signifying that the first chamber is leaking is displayed when the pressure change of the first chamber is greater than the pressure change of the second chamber.

8. The leak detection method of claim 1, wherein a leak detection indicator signifying that the second chamber is leaking is displayed when the pressure change of the second chamber is greater than the pressure change of the first chamber.

9. The leak detection method of claim 1, wherein the step of comparing the pressure changes comprises determining a chamber pressure difference by subtracting the pressure change of the first chamber from the pressure change of the second chamber.

10. The leak detection method of claim 9, wherein a leak detection indicator signifying that the first chamber is leaking is displayed when the chamber pressure difference is greater than a predetermined pressure value.

11. The leak detection method of claim 10, wherein a leak detection indicator signifying that the second chamber is leaking is displayed when the chamber pressure difference is less than the inverse of the predetermined pressure value.

12. A system for detecting air leaks in an air bed, the system comprising:
    a mattress including first and second independently adjustable air chambers;
    a hand-held remote control including one or more inputs configured for allowing selection of a leak detection test sequence by an operator;
    at least one pump configured for adjusting the first and second chambers to an initial pressure level upon selection of the leak detection test sequence by the operator;
    at least one pressure sensor configured for sensing a first pressure value of the first chamber and a first pressure value of the second chamber after a first time interval, and for sensing a second pressure value of the first chamber and a second pressure value of the second chamber after a second time interval;
    a control device operably connected to the at least one pressure sensor, the control device having control logic that is capable of determining a pressure change of the first chamber, determining a pressure change of the second chamber, and comparing the pressure change of the first chamber with the pressure change of the second chamber to determine if there is a leak in the first chamber or the second chamber, the control logic being capable of comparing the pressure change of the first chamber and the pressure change of the second chamber with a maximum acceptable pressure change value; and a display, provided on the hand-held remote control, configured for displaying a leak detection indicator based upon the pressure changes of the first and second chambers.

13. The system of claim 12, wherein the pressure sensor is a pressure transducer.

14. The system of claim 12, wherein the control device comprises power supply, at least one microprocessor, at least one switching means, and at least one analog to digital (A/D) converter.

15. The system of claim 14, wherein the switching means is one of a relay or a solid state switch.

16. The system of claim 12, further comprising a second pump such that a separate pump is associated with each chamber, allowing each chamber to be inflated or deflated independently and simultaneously.

17. The system of claim 12, further comprising a second pressure sensor such that a separate pressure sensor is associated with each chamber.

18. The system of claim 12, further comprising an opening relief valve adapted to allow air to escape from the first and second chambers.

19. The system of claim 12, wherein the hand-held remote control is a wireless remote control.

20. A method for detecting a leak in an air bed having first and second independently adjustable chambers, the method comprising:
- initiating a leak detection test by making one or more selections on a hand-held remote control;
- sensing a first pressure value of the first chamber and a first pressure value of the second chamber at a first time;
- sensing a second pressure value of the first chamber and a second pressure value of the second chamber at a second time;
- determining a pressure change of the first chamber;
- determining a pressure change of the second chamber;
- determining a pressure change differential between the first and second chambers;
- comparing the pressure change differential with a predetermined pressure value to determine if there is a leak in the first chamber or the second chamber;
- comparing the pressure change of the first chamber and the pressure change of the second chamber with a maximum acceptable pressure change value; and
- displaying a leak detection indicator, based upon the pressure changes of the first and second chambers, on a display of the hand-held remote control.

21. The method of claim 20, wherein the hand-held remote control is a wireless remote control.

\* \* \* \* \*